United States Patent
Clark et al.

(10) Patent No.: US 7,160,424 B2
(45) Date of Patent: Jan. 9, 2007

(54) ELECTROPHORETICALLY DEPOSITED HYDROPHILIC COATINGS FOR FUEL CELL DIFFUSER/CURRENT COLLECTOR

(75) Inventors: John Charles Clark, White Bear Lake, MN (US); Joseph William Frisk, Oakdale, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 689 days.

(21) Appl. No.: 09/997,081

(22) Filed: Nov. 28, 2001

(65) Prior Publication Data

US 2003/0098236 A1    May 29, 2003

(51) Int. Cl.
    C25D 13/02    (2006.01)
(52) U.S. Cl. .................... 204/490; 204/491
(58) Field of Classification Search ............ 204/490, 204/491
    See application file for complete search history.

(56) References Cited

U.S. PATENT DOCUMENTS

| | | | |
|---|---|---|---|
| 4,175,165 A | | 11/1979 | Adlhart |
| 5,298,348 A | | 3/1994 | Kung |
| 5,389,471 A | | 2/1995 | Kung |
| 5,468,358 A | | 11/1995 | Ohkawa et al. |
| 5,554,271 A | * | 9/1996 | Illston et al. ............ 204/479 |
| 5,840,414 A | * | 11/1998 | Bett et al. ............. 428/307.7 |
| 5,998,058 A | | 12/1999 | Fredley |
| 6,024,848 A | | 2/2000 | Dufner et al. |
| 6,080,504 A | | 6/2000 | Taylor et al. |
| 6,083,638 A | | 7/2000 | Taniguchi et al. |

FOREIGN PATENT DOCUMENTS

WO    WO 01/17050    3/2001

OTHER PUBLICATIONS

Boccaccini, A. R. et al; "*Use of Electrophoretic Deposition in the Processing of Fibre Reinforced Ceramic and Glass Matrix Composites: A Review*", Composites Part A: Applied Science and Manufacturing, Elsevier Science Publishers, B. V., Amsterdam, NL, vol. 32, No. 8, Aug. 2001, pp. 997-1006.

Zhitomirsky, I. et al.; "*Formation of Hollow Fibers by Electrophoretic Deposition*", Materials Letters, North Holland Publishing Company, Amsterdam, NL., vol. 38, No. 1, Jan. 1999, pp. 10-17.

Sarkar, P. et al.; "*Electrophoretic Deposition (EPD) of Controlled Ceramic Microstructures*", Innovative Processing/Synthesis: Ceramics, Glasses, Composites, 1997, pp. 231-250.

Sarkar, P. et al.; "*Electrophoretic Deposition (EPD): Mechanisms, Kinetics, and Application to Ceramics*", Journal of the American Ceramic Society, vol. 79, No. 8, Aug. 1996, pp. 1987-2002.

* cited by examiner

Primary Examiner—Kishor Mayekar
(74) Attorney, Agent, or Firm—Philip Y. Dahl

(57) ABSTRACT

A method is provided for making a hydrophilic carbon fiber construction, such as a fuel cell gas diffusion layer or diffuser/current collector, by electrophoretic deposition of a metal oxide selected from Type I or Type II, where Type I consists of metal oxides having a negative zeta potential and Type II consists of metal oxides having a positive zeta potential. A hydrophilic carbon fiber construction is provided, such as a fuel cell gas diffusion layer or diffuser/current collector, which is coated with a metal oxide and capable of wicking 200 mg of water per 40 mg of the hydrophilic carbon fiber construction.

3 Claims, 4 Drawing Sheets

ELECTROPHORETICALLY DEPOSITED HYDROPHILIC COATINGS FOR FUEL CELL DIFFUSER/CURRENT COLLECTOR

FIELD OF THE INVENTION

This invention relates to a method of making a hydrophilic carbon fiber construction such as a fuel cell gas diffusion layer or diffuser/current collector by electrophoretic deposition of a metal oxide selected from Type I or Type II, where Type I consists of metal oxides having a negative zeta potential and Type II consists of metal oxides having a positive zeta potential. This invention additionally relates to a hydrophilic carbon fiber construction which is coated with a metal oxide and capable of wicking 200 mg of water per 40 mg of the hydrophilic carbon fiber construction.

BACKGROUND OF THE INVENTION

U.S. Pat. No. 5,840,414 discloses a carbon plate for use in a fuel cell system which is rendered hydrophilic by incorporation of a metal oxide. The reference lists potential methods at col. 5, lines 31–52. The reference describes in detail and exemplifies a three-step method of incorporating metal oxide in a graphite plate by treatment with a metal chloride, in situ conversion of the metal chloride to metal hydroxide, and in situ conversion of the metal hydroxide to metal oxide. (col 5, line 53–col. 6, line 21; and col. 7, lines 7–25).

U.S. Pat. No. 6,080,504 discloses a method of electrodeposition of catalytic metal on a substrate to form a gas diffusion electrode using a pulsed electric current.

U.S. Pat. No. 4,175,165 discloses a fuel cell system that includes bipolar plates having hydrophilic surfaces. The surfaces may be made hydrophilic by application of wetting agents such as silica sols, alumina, or silica-alumina. ('165 at col. 6, lines 13–22).

WO 01/17050 discloses a method of making a structural fuel cell component hydrophilic by use of a metal oxyhydroxide, oxyhydroxide hydrate, or oxide hydrate.

U.S. Pat. Nos. 5,298,348 and 5,389,471 disclose a separator for an alkaline battery system.

U.S. Pat. No. 6,083,638 discloses a fuel cell system that includes a current collector that includes hydrophilic materials and can also include hydrophobic materials. The current collector may be made of fibers such as carbon, glass or resin fibers. The hydrophilic material or bulking agent may be particles of materials such as carbon powder, metal powder, glass powder, ceramic powder, silica gel, zeolite or non-fluorinated resin. The hydrophobic material or bulking agent may be particles of materials such as fluorinated resin. (see, '638 FIG. 10).

U.S. Pat. No. 5,998,058 discloses an electrode backing layer for a polymer electrolyte membrane fuel cell formed from a carbon fiber substrate treated so as to contain both "hydrophilic" and "hydrophobic" pores. The reference describes a method of making pores more hydrophilic by immersion in a solution of tin tetrachloride pentahydrate followed by immersion in ammonia.

U.S. Pat. No. 6,024,848 discloses a porous support plate for an electrochemical cell which includes a contact bilayer adjacent to an electrode including a hydrophobic and a hydrophilic phase. The reference discloses a hydrophilic phase comprised of a mixture of carbon black and a proton exchange resin.

SUMMARY OF THE INVENTION

Briefly, the present invention provides a method of making a hydrophilic carbon fiber construction such as a fuel cell gas diffusion layer or diffuser/current collector comprising the steps of: a) immersing a carbon fiber construction in an aqueous dispersion of a metal oxide selected from Type I or Type II, where Type I consists of metal oxides having a negative zeta potential such as $SnO_2$ and $SiO_2$, and Type II consists of metal oxides having a positive zeta potential such as $ZrO_2$; b) contacting the dispersion with a counterelectrode; and c) electrophoretically depositing the metal oxide on the carbon fiber construction by applying electric current between the carbon fiber construction and the counterelectrode, where carbon fiber construction is the anode when the metal oxide is selected from Type I and carbon fiber construction is the cathode when the metal oxide is selected from Type II.

In another aspect, the present invention provides a hydrophilic carbon fiber construction such as a fuel cell gas diffusion layer capable of wicking 200 mg of water per 40 mg of the hydrophilic carbon fiber construction.

What has not been described in the art, and is provided by the present invention, is a method of manufacturing a hydrophilic gas diffusion layer for use in a fuel cell by electrophoretic deposition of a metal oxide selected from Type I or Type II, defined herein, to provide a hydrophilic carbon fiber construction with high water absorption speed and capacity.

It is an advantage of the present invention to provide a quick and convenient method of manufacturing a hydrophilic gas diffusion layer having a uniform coating of a metal oxide.

DETAILED DESCRIPTION OF PREFERRED EMBODIMENTS

The present invention provides an electrophoretic method of making a hydrophilic carbon fiber construction such as a fuel cell gas diffusion layer or diffuser/current collector. Briefly, the present method comprises the steps of: a) immersing a carbon fiber construction in an aqueous dispersion of a metal oxide selected from Type I or Type II, where Type I consists of metal oxides having a negative zeta potential such as $SnO_2$ and $SiO_2$, and Type II consists of metal oxides having a positive zeta potential such as $ZrO_2$; b) contacting the dispersion with a counterelectrode; and c) electrophoretically depositing the metal oxide on the carbon fiber construction by applying electric current between the carbon fiber construction and the counterelectrode, where carbon fiber construction is the anode when the metal oxide is selected from Type I and carbon fiber construction is the cathode when the metal oxide is selected from Type II.

Fuel cells are electrochemical cells which produce usable electricity by the catalyzed combination of a fuel such as hydrogen and an oxidant such as oxygen. Typical fuel cells contain layers known as gas diffusion layers or diffuser/current collector layers adjacent to catalytically reactive sites. These layers must be electrically conductive yet must be able to allow the passage of reactant and product fluids. Typical gas diffusion layers comprise porous carbon materials. In some fuel cell systems, it is advantageous to use a gas diffusion layer which is more hydrophilic than untreated carbon. The present invention concerns the manufacture of hydrophilic gas diffusion layers.

Any suitable carbon fiber construction may be used. Typically the carbon fiber construction is selected from woven and non-woven carbon fiber constructions. Carbon fiber constructions which may be useful in the practice of the present invention may include: Toray™ Carbon Paper, SpectraCarb™ Carbon Paper, AFN™ non-woven carbon cloth, Zoltek™ Carbon Cloth, and the like.

Figure 1:
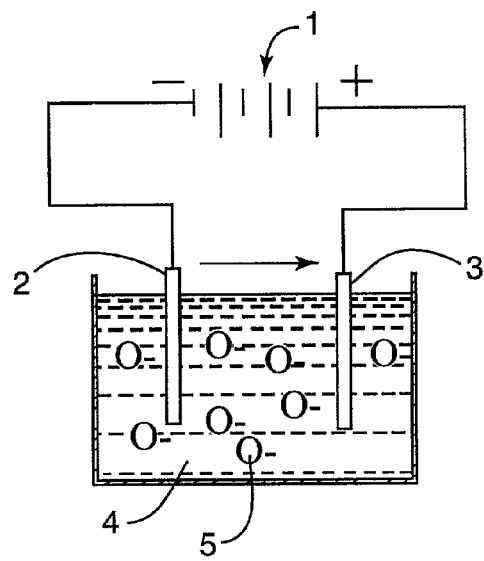
FIG. 1 is a schematic depiction of a electrophoresis apparatus useful in the method according to the present invention.

Any suitable electrodeposition equipment may be used. FIG. 1 is a schematic depiction of a electrophoresis apparatus useful in the method according to the present invention including a current source (1), a cathode (2), an anode (3), and a bath (4) containing the metal oxide particles (5). A Hull Cell may be used. A typical counterelectrode is mild steel plate. Any suitable source of electric current may be used.

Any suitable aqueous dispersion of metal oxide particles may be used. The dispersion may be a colloidal suspension or a latex. Average particle size in the dispersion is typically less than 100 nm, more typically less than 70 nm, more typically less than 50 nm, and most typically less than 30 nm. The metal oxide is selected from one of two groups, Type I and Type II. Type I metal oxides have a negative zeta potential when measured in aqueous suspension. Type I metal oxides include $SnO_2$, $SiO_2$. Type II consists of metal oxides having a positive zeta potential when measured in aqueous suspension. Type II metal oxides include $ZrO_2$.

Where the metal oxide is a Type I metal oxide, the electric current is applied between the carbon fiber construction, as anode, and the counterelectrode, as cathode. Where the metal oxide is a Type II metal oxide, the carbon fiber construction is the cathode and the counterelectrode is the cathode. The electric current applied is sufficient to deposit the desired amount of metal oxide. Typically, the electric current is driven by a voltage of at least 6 volts, more typically at least 12 volts, and most typically at least 24 volts. Typically, the electric current density is at least 0.3 $\mu A/cm^2$, more typically at least 3 $\mu A/cm^2$, and most typically at least 30 $\mu A/cm^2$.

It is an advantage of the present method that it can be performed in a speedy manner and is therefore suitable for commercial production. Typically, the duration of the electrodeposition step is not more than 30 minutes, more typically not more than 15 minutes.

Typically the metal oxide is deposited onto the carbon fiber construction in the amount of at least 0.1 weight percent per weight of carbon fiber construction, more typically at least 1 weight percent, more typically at least 2 weight percent, and most typically at least 5 weight percent.

Typically, the treated carbon fiber construction is subsequently rinsed and dried.

The treated carbon fiber construction may also be heated to further dry the metal oxide particles, typically to a temperature of at least 150° C., more typically at least 250 ° C., and most typically at least 350° C. Heating time is typically at least 10 minutes, more typically at least 20 minutes, and most typically at least 30 minutes.

Additional coatings may be added to the carbon fiber construction. Hydrophobic coatings may be added to the carbon fiber construction, such as fluoropolymer/carbon coatings.

Figure 4:
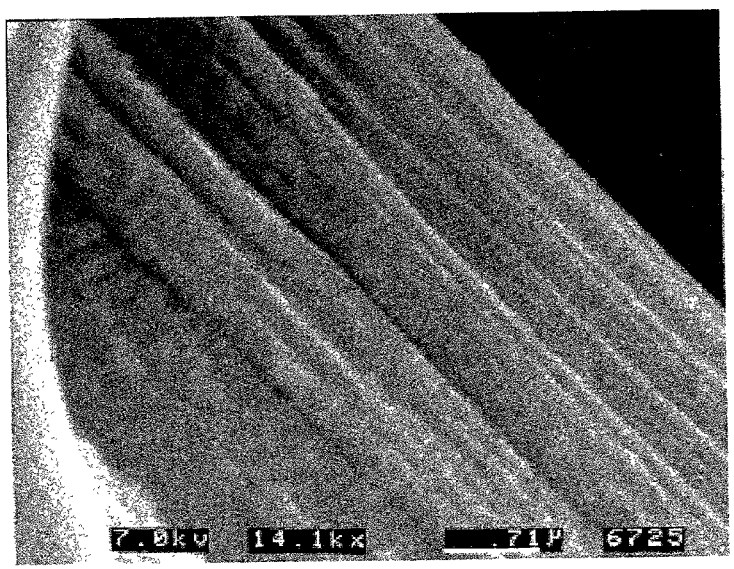
FIG. 4 is an electron micrograph of a carbon fiber treated with tin oxide according to the method of the present invention.
Figure 6:
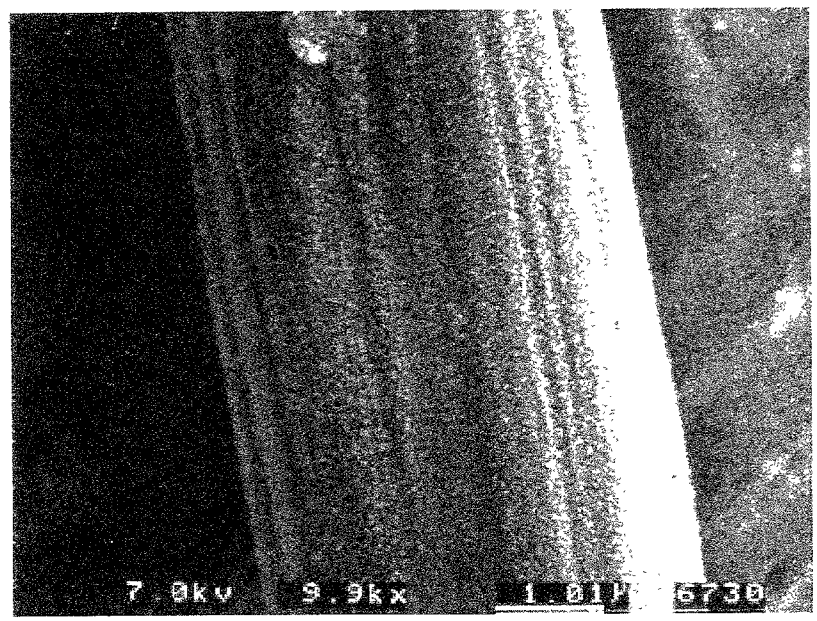
FIG. 6 is an electron micrograph of a carbon fiber treated with zirconia according to the method of the present invention.

Metal oxide coatings produced according to the method of the present invention are highly uniform. FIGS. 4 and 6 are micrographs of substrates coated according to the present invention. It can be seen that the particles form a uniform layer on the surface of the fibers.

The uniformity of metal oxide coatings produced according to the method of the present invention is believed to contribute to the high degree of water absorption exhibited by the hydrophilic carbon fiber constructions according to the present invention. Hydrophilic carbon fiber constructions according to the present invention can typically absorb or wick at least 200 mg of water per 40 mg of the construction. More typically, theses constructions can absorb or wick at least 250 mg of water per 40 mg of the construction. Typically, the hydrophilic carbon fiber construction according to the present invention can wick 200 mg of water per 40 mg of the construction in 60 seconds or less. More typically, the hydrophilic carbon fiber construction according to the present invention can wick 250 mg of water per 40 mg of the construction in 60 seconds or less.

This invention is useful in the manufacture of hydrophilic fuel cell gas diffusion layers.

Objects and advantages of this invention are further illustrated by the following examples, but the particular materials and amounts thereof recited in these examples, as well as other conditions and details, should not be construed to unduly limit this invention.

EXAMPLES

Unless otherwise noted, all reagents were obtained or are available from Aldrich Chemical Co., Milwaukee, Wis., or may be synthesized by known methods.

Examples 1 and 2C

In Example 1, Toray™ Carbon Paper 060 (Toray International Inc., Tokyo, Japan) was treated with Nalco® 2327 colloidal silica (Ondeo Nalco Company, Naperville, Ill.), nominally having a particle size 20 nm, using an electrophoretic deposition process. The particle size (diameter) was found to be 27 nm when measured using a ZetaPlus dynamic light scattering apparatus (Brookhaven Inst. Corp., Holtville, N.Y.). When the suspension was diluted to 1% by weight with deionized water, the zeta potential on the particles was found to be –26 mV measured using a ZetaPALS instrument (Brookhaven Inst. Corp., Holtville, N.Y.). Since the zeta potential is negative, the carbon paper was used as the anode of the electrolytic cell, as shown in FIG. 1, and a mild steel plate was used as the cathode. The silica suspension was diluted to 1% by weight with deionized water. A 30 volt potential was applied between the anode and cathode for 10 minutes to deposit the silica particles on the carbon paper. A current of about 5 microamps was generated during the deposition. The sample was dried and weighed. The add-on was 2.8 weight %.

A 40 mg coupon was cut from the dried sample and contact angle and wicking were measured using deionized water and a Cahn DCA-322 Dynamic Contact Angle Analyzer (Thermo Cahn, Madison, Wis.). The coated carbon paper had both a zero degree advancing and a zero degree receding contact angle. Wicking of water was almost instantaneous.

In Comparative Example 2C, the same Toray carbon paper as used in Example 1 was dipped in the same Nalco® 2327 colloidal silica, diluted to 1% by weight with deionized water, for 10 minutes. After this procedure the sample was dried and tested for contact angle and wicking as above. The contact angle for the paper in water was 127 advancing and 18 receding. Wicking of water into the sample was not apparent.

Figure 2:
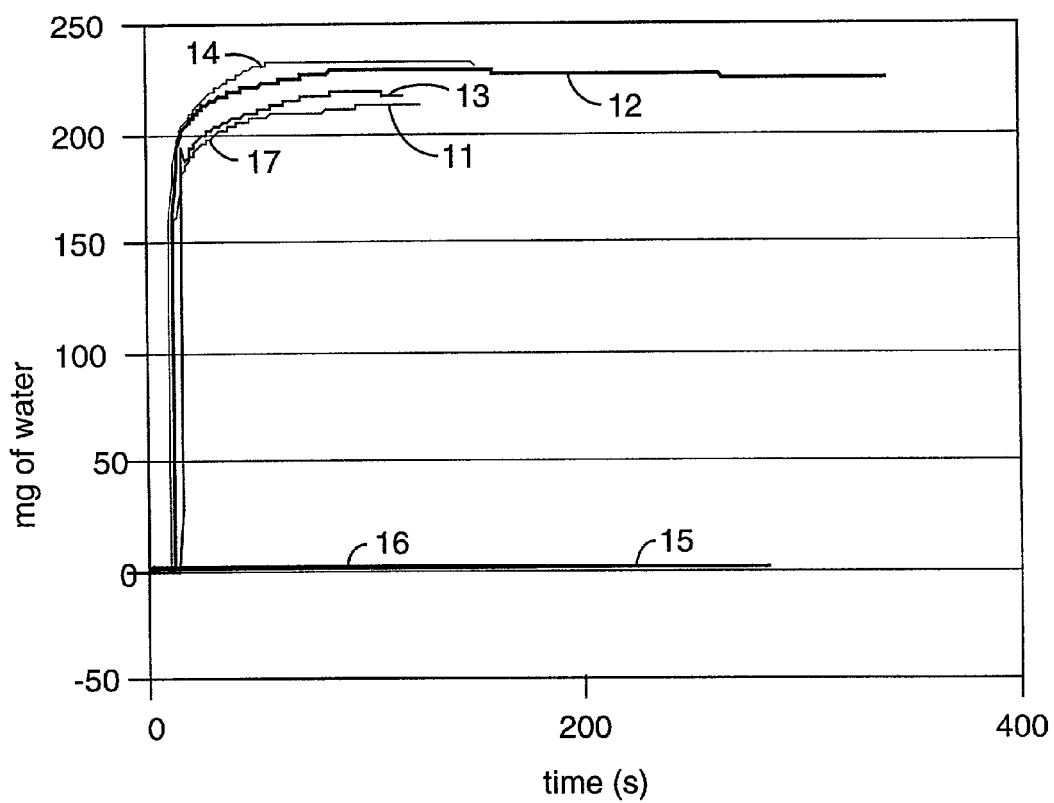
FIG. 2 is a graph of water absorbed vs. time in a water wicking analysis of carbon papers treated according to the method of the present invention as well as two comparative carbon papers.

FIG. 2 is a graph of water absorbed vs. time in a water wicking analysis of carbon papers treated according to this example and comparative carbon papers. Trace 16 is a comparative uncoated paper. Trace 15 is the comparative paper according to Example 2C. Trace 12 is the initial result for a paper treated according to Example 1. Trace 13 is the result for a paper treated according to Example 1 and subsequently wet and dried. Trace 14 is a similar paper wet and dried twice. Trace 11 is a similar paper wet and dried four times and vigorously. Trace 17 is a similar paper which was heated to 380° C. for 10 minutes. The resulted disclosed in the graph indicate that the coating according to Example 1 is durable.

Example 3

Figure 3:
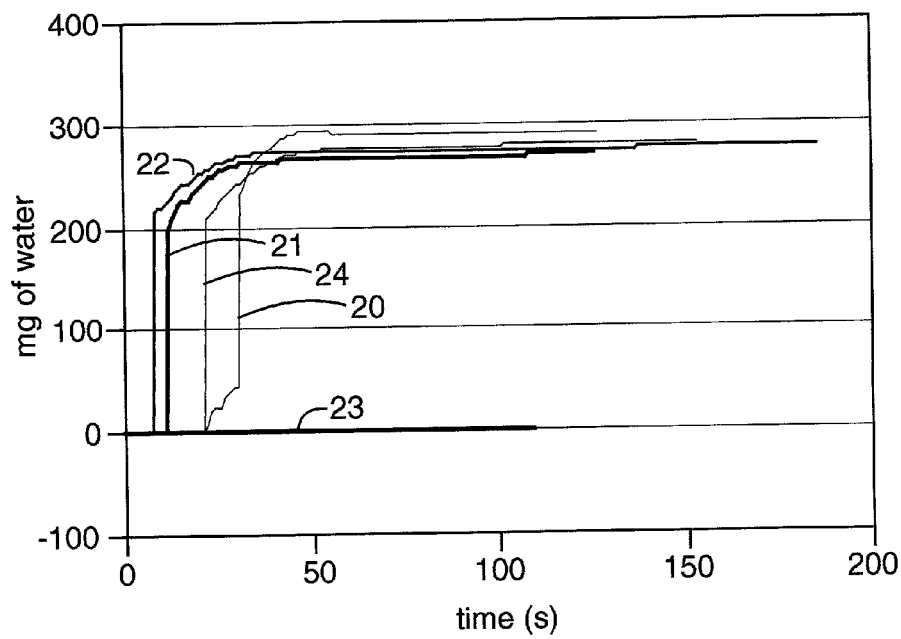
FIG. 3 is a graph of water absorbed vs. time in a water wicking analysis of carbon fibers treated according to the method of the present invention as well as comparative untreated carbon fibers.

Textron 1071 HCB carbon fiber (Textron Inc., Providence, R.I.) was electrophoretically deposited with Nalco® 2327 colloidal silica by the method disclosed in Example 1. The carbon fibers were coated, dried and tested for contact angle and wicking. The contact angle of the treated carbon cloth was zero advancing and zero receding. FIG. 3 shows wicking results for comparative untreated fibers (23) and for treated fibers measured in four successive wicking trials, first (20), second (21), third (22), and fourth (24). Again, an effective and durable wet ability treatment was shown.

Examples 4 and 5C

In Example 4, Toray™ Carbon Paper 060 (Toray International Inc., Tokyo, Japan) was treated with Nyacol® SN15CG $SnO_2$ dispersion (Nyacol Nano Technologies, Inc., Ashland, Mass.) using an electrophoretic deposition process. The particle size (diameter) was found to be 41 nm when measured using a ZetaPlus dynamic light scattering apparatus (Brookhaven Inst. Corp., Holtville, N.Y.). When the suspension was diluted to 1% by weight with deionized water, the zeta potential on the particles was found to be −21 mV measured using a ZetaPALS instrument (Brookhaven Inst. Corp., Holtville, N.Y.). Since the zeta potential is negative, the carbon paper was used as the anode (3) of the electrolytic cell, as shown in FIG. 1, and a mild steel plate was used as the cathode (2). The tin oxide suspension (4) was diluted to 1% by weight with deionized water. A 10 volt potential (1) was applied between the anode and cathode for 10 minutes to deposit the silica particles (5) on the carbon paper. The sample was dried and weighed. The add-on was 4.3 weight %.

Contact angle and water wicking was tested as described above. The contact angle of the treated paper was 58 degrees advancing and zero degrees receding. A 4.3% by weight add-on of the SnO2 was determined for this experiment. FIG. 4 is an electron micrograph of a carbon fiber thus treated with tin oxide demonstrating the uniformity of the coating obtained.

In Comparative Example 5C, a dip-coated sample was made by following the same procedure as Comparative Example 2C and substituting a Nyacol® SN15CG $SnO_2$ dispersion, diluted to 1% by weight with deionized water, for the Nalco® 2327 colloidal silica.

Figure 5:
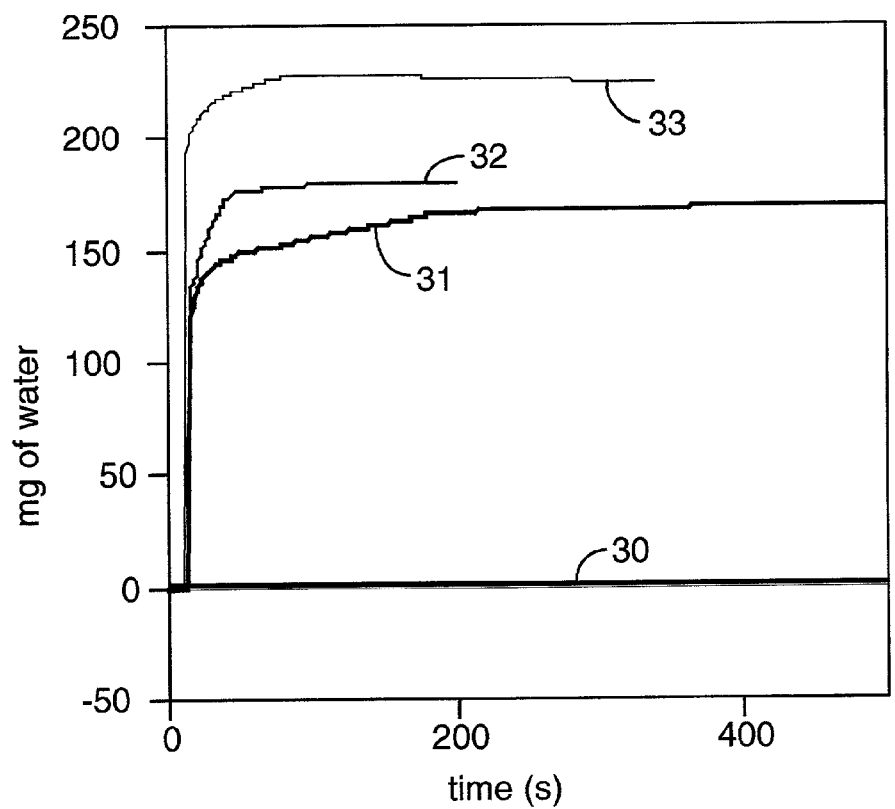
FIG. 5 is a graph of water absorbed vs. time in a water wicking analysis of carbon papers treated according to the method of the present invention as well as a comparative carbon paper.

FIG. 5 compares wicking results for the paper of Comparative Example 5C (30), Example 4 (32), Example 4 repeated after 24 hours (31), and Example 1 (33).

Example 6

In this example, Toray™ Carbon Paper 060 (Toray International Inc., Tokyo, Japan) was treated with Nalco® colloidal zirconia (Ondeo Nalco Company, Naperville, Ill.). The particle size (diameter) was found to be 66 nm when measured using a ZetaPlus dynamic light scattering apparatus (Brookhaven Inst. Corp., Holtville, N.Y.). When the suspension was diluted to 1% by weight with deionized water, the zeta potential on the particles was found to be+30 mV measured using a ZetaPALS instrument (Brookhaven Inst. Corp., Holtville, N.Y.). Since the zeta potential is positive, the carbon paper was used as the cathode of the electrolytic cell, and a mild steel plate was used as the anode. The silica suspension was diluted to 1% by weight with deionized water. A 20 volt potential was applied between the anode and cathode for 10 minutes to deposit the silica particles on the carbon paper. A current of 9.0 microamps was generated during the deposition. The sample was dried and weighed. The add-on was 6.8 weight %.

FIG. 6 is an electron micrograph of a carbon fiber thus treated with zirconia demonstrating the uniformity of the coating obtained.

Figure 7:
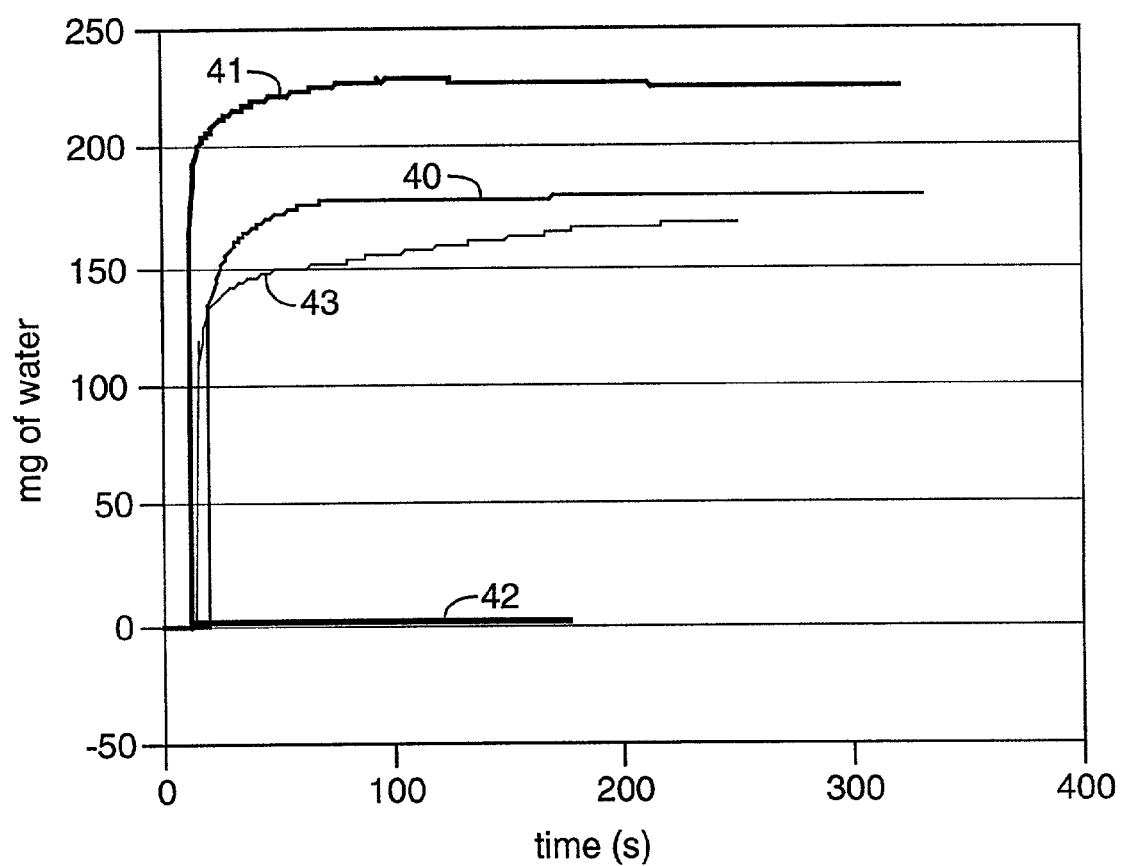
FIG. 7 is a graph of water absorbed vs. time in a water wicking analysis of carbon papers treated according to the method of the present invention as well as a comparative carbon paper.

FIG. 7 compares wicking results for a comparative untreated paper (42), Example 4 using tin oxide (43), Example 6 using zirconia (40), and Example 1 using silica (41). Silica appears the most effective at generating a wicking surface, zirconia is the second most effective and SnO2 is the third. Any of these treatments will substantially improve wetability.

Various modifications and alterations of this invention will become apparent to those skilled in the art without departing from the scope and principles of this invention, and it should be understood that this invention is not to be unduly limited to the illustrative embodiments set forth hereinabove. All publications and patents are herein incorporated by reference to the same extent as if each individual publication or patent was specifically and individually indicated to be incorporated by reference.

We claim:

1. A method of making a hydrophilic carbon fiber construction comprising the steps of:
   a) immersing a carbon fiber construction in an aqueous dispersion of a metal oxide having a positive zeta potential;
   b) contacting said dispersion with a counterelectrode; and c) electrophoretically depositing said metal oxide on said carbon fiber construction by applying electric current between said carbon fiber construction and said counterelectrode, wherein said carbon fiber construction is the cathode, wherein said metal oxide is $ZrO_2$.

2. A method of making a hydrophilic carbon fiber construction comprising the steps of:
   a) immersing a carbon fiber construction in an aqueous dispersion of a metal oxide selected from Type I or Type II, wherein Type I consists of metal oxides having a negative zeta potential and Type II consists of metal oxides having a positive zeta potential;
   b) contacting said dispersion with a counterelectrode; and
   c) electrophoretically depositing said metal oxide on said carbon fiber construction by applying electric current between said carbon fiber construction and said counterelectrode, wherein, when said metal oxide is selected from Type I said carbon fiber construction is the anode and when said metal oxide is selected from Type II said carbon fiber construction is the cathode, wherein said carbon fiber construction is a woven carbon fiber construction.

3. A method of making a hydrophilic carbon fiber construction comprising the steps of:
   a) immersing a carbon fiber construction in an aqueous dispersion of a metal oxide selected from Type I or Type II, wherein Type I consists of metal oxides having a negative zeta potential and Type II consists of metal oxides having a positive zeta potential;
   b) contacting said dispersion with a counterelectrode; and
   c) electrophoretically depositing said metal oxide on said carbon fiber construction by applying electric current between said carbon fiber construction and said counterelectrode, wherein, when said metal oxide is selected from Type I said carbon fiber construction is the anode and when said metal oxide is selected from Type II said carbon fiber construction is the cathode, wherein said carbon fiber construction is a non-woven carbon fiber construction.

* * * * *

UNITED STATES PATENT AND TRADEMARK OFFICE
CERTIFICATE OF CORRECTION

PATENT NO. : 7,160,424 B2 Page 1 of 1
APPLICATION NO. : 09/997081
DATED : January 9, 2007
INVENTOR(S) : John C. Clark It is certified that error appears in the above-identified patent and that said Letters Patent is hereby corrected as shown below:

<u>First Page of the Title Pages, Item [56] Col. 2, under (Other Publications)</u>
Line 2, delete "Fibre" and insert -- Fiber --, therefor.

<u>Col. 1</u>
Line 54, delete "'638" and insert -- '638 --, therefor.

<u>Col. 2</u>
Line 36, delete "a" and insert -- an --, therefor.

<u>Col. 6</u>
Line 49, delete "SnO2" and insert -- $SnO_2$ --, therefor.
Line 64, in Claim 1, delete "aqucous" and insert -- aqueous --, therefor.

Signed and Sealed this

Twelfth Day of June, 2007

JON W. DUDAS
*Director of the United States Patent and Trademark Office*